UNITED STATES PATENT OFFICE.

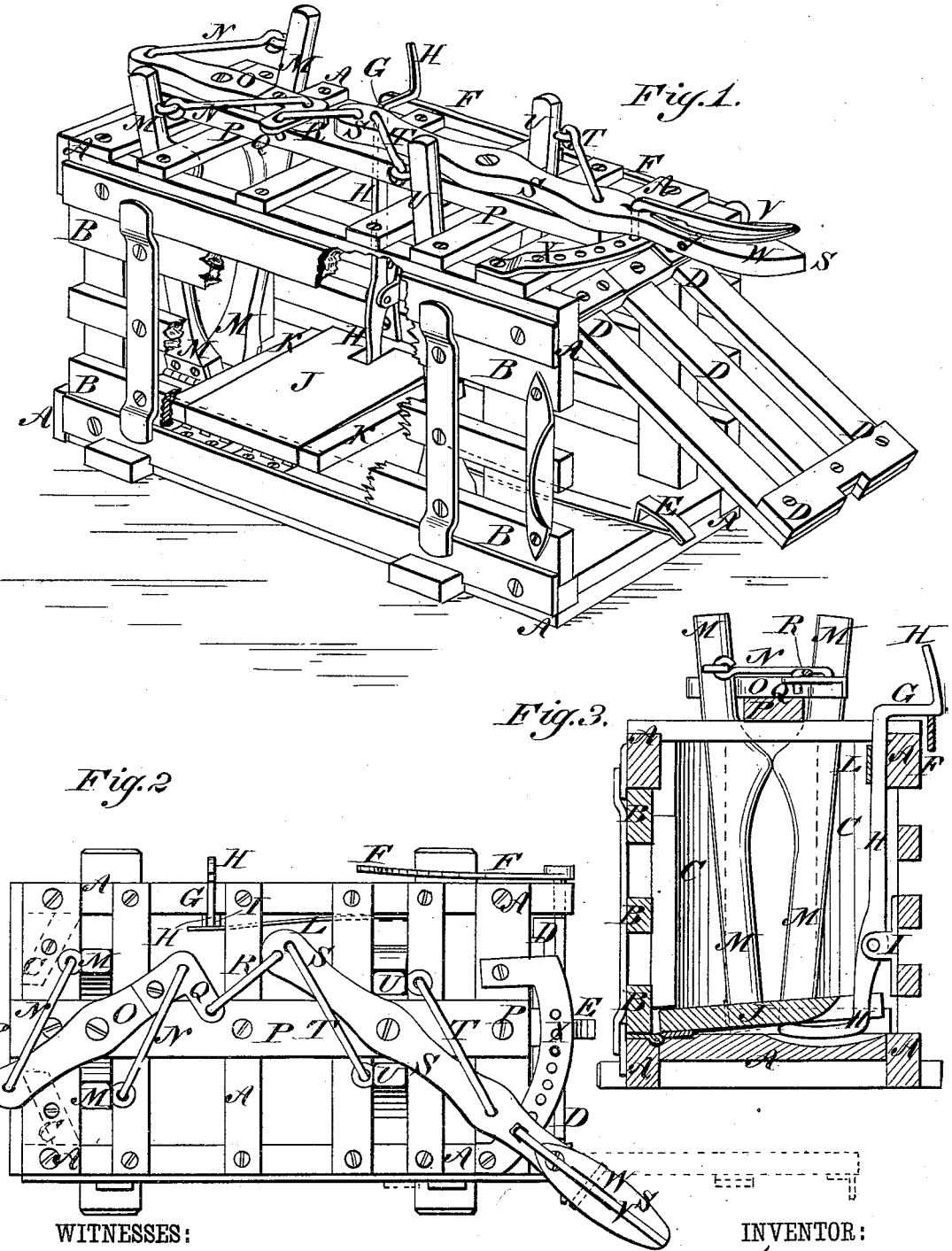

ANTHONY ST. MARY, OF DECATUR, ILLINOIS.

HOG-TRAP.

SPECIFICATION forming part of Letters Patent No. 241,087, dated May 3, 1881.

Application filed January 17, 1881. (No model.)

*To all whom it may concern:*

Be it known that I, ANTHONY ST. MARY, of Decatur, in the county of Macon and State of Illinois, have invented a new and useful Improvement in Hog-Traps, of which the following is a specification.

Figure 1 is a perspective view of my improvement, parts being broken away. Fig. 2 is a plan view of the same, and Fig. 3 is a sectional end elevation.

The object of this invention is to facilitate catching hogs and other animals and holding them while being ringed, castrated, or marked.

Similar letters of reference indicate corresponding parts.

A represents the frame of the trap, which is made of a suitable size to receive the hog or animal to be caught. One side, B, of the frame A is separate and detachable from the other parts, and its upper and lower edges slide in horizontal grooves or ways at the upper and lower parts of the said frame, so that the hog can be released from the trap by sliding back the side B.

The forward end of the trap-frame A is formed of two upright bars, C, the inner edges of which are inclined forward and are beveled, as shown in dotted lines in Fig. 2. The inner edges of the bars C are placed at such a distance apart that the hog can pass his head into but not through the space between them.

The open rear end of the trap-frame A is closed by a door, D, which is hinged at its upper edge to the upper part of the said trap-frame A. The door D is secured in place, when closed, by a spring-catch, E, attached to the bottom of the trap-frame A in such a position as to engage with the lower edge of the said door D when swung shut.

To the door D, or to one of its pivots, is attached the end of a lever, F, which projects upward when the door is closed and projects forward when the door is open, so that its forward end may engage with the shoulder or offset G, formed upon the upper part of the upright lever H. The lever H, at a little distance from its lower end, is pivoted to a support, I, attached to the side of the trap-frame A. The lower end of the lever H is bent inward, and is curved upward, so as to project beneath the end of the platform J, which crosses the forward part of the bottom of the trap-frame A, and is hinged at its other end to the said bottom. The side edges of the platform J are protected by cleats K, attached to the bottom of the trap-frame A. The upper part of the lever H is pressed outward with sufficient force to support the platform J in an inclined position by a spring, L, attached to the trap-frame A, as shown in Figs. 2 and 3.

With this construction, when the platform J is pressed downward by the weight of an animal stepping upon it, the movement of the said platform operates the lever H to withdraw its shoulder from the lever F and allow the door D to swing shut, inclosing the animal.

To the forward part of the floor of the trap-frame A, at a little distance from the lower ends of the upright bars C, are hinged the lower ends of two bars, M, the upper ends of which project through a transverse opening in the top of the trap-frame A.

To the upper ends of the hinged bars M are pivoted the outer ends of two rods, N, the inner ends of which are pivoted to the lever O upon the opposite sides of and equally distant from the pivoting-point of the said lever O. The lever O is pivoted to a longitudinal bar, P, attached to the top of the trap-frame A, along its central line, so that the upper ends of the hinged bars M will be moved toward and from each other by operating the said lever O.

To the end of an arm, Q, formed upon or rigidly attached to the inner end of the lever O and projecting at right angles, or nearly so, with the said lever O, is pivoted the end of a rod or link, R. The other end of the rod or link R is pivoted to the end of a lever, S, which is pivoted to the rear part of the bar P.

To the lever S, upon the opposite sides of and equally distant from its pivoting-point, are pivoted the inner ends of two connecting-rods, T, the outer ends of which are pivoted to the upper ends of two bars, U. The bars U pass down through a transverse opening in the top of the trap-frame A, and their lower ends are hinged to the rear part of the bottom of the said trap-frame A in the same manner as the bars M. The rear end of the lever S projects at the rear end of the trap-frame A to serve as a handle for opening and closing the bars M U.

To the rear part of the lever S is pivoted a lever, V, the rear end of which is held upward by a spring, W, attached to the said lever S. The forward end of the lever V, or a pin formed upon or attached to the said forward end, projects downward to pass through a slot in the lever S and enter one or another of the several holes in a bar or plate, X, attached to the top of the trap-frame A, to lock the lever S, and with it the bars M U, in any position into which they may be adjusted.

If desired, the lever and spring may be omitted and only the pin and catch-plate used.

In using the trap the door D is opened and is secured by passing the lever F beneath the shoulder of the lever H, and the bars M U are spread apart by operating the lever S. The hog or other animal is then driven to the rear end of the trap-frame A, when, seeing the opening in the forward end of the said trap, he enters the trap and steps upon the platform J, causing the door D to shut and fasten itself. The lever S is then operated to draw the upper ends of the bars M U toward each other, the forward pair of bars, M, clasping his neck and the rear pair, U, clasping the rear part of his body, so that he will be held securely and can be operated upon as desired.

When the desired operation has been performed the bars M U are spread apart by operating the lever S, and the separable side B is drawn back, allowing the animal to walk out of the trap.

Having thus fully described my invention, I claim as new and desire to secure by Letters Patent—

In a hog-trap, the combination, with the frame A, of the hinged bars M U, their connecting-rods N R T, and the levers O S, substantially as herein shown and described, whereby the animal can be simultaneously clasped by the neck and flank and held securely, as set forth.

ANTHONY ST. MARY.

Witnesses:
HENDERSON B. MATHENY,
CHARLES M. DURFEE.